United States Patent
Ostrow et al.

(10) Patent No.: US 6,991,241 B1
(45) Date of Patent: Jan. 31, 2006

(54) CHILD SAFETY SEAT DOLLY HAVING CLAMPING BRACKET

(75) Inventors: Kenneth P. Ostrow, Los Gatos, CA (US); Kerry Williams, San Jose, CA (US)

(73) Assignee: Go-Go Babyz Corp., San Jose, CA (US)

( * ) Notice: Subject to any disclaimer, the term of this patent is extended or adjusted under 35 U.S.C. 154(b) by 0 days.

(21) Appl. No.: 10/936,714

(22) Filed: Sep. 9, 2004

(51) Int. Cl.
*B62B 7/00* (2006.01)

(52) U.S. Cl. .............................. 280/47.41; 280/47.38; 280/643; 280/30

(58) Field of Classification Search ............ 280/47.25, 280/47.38, 47.41, 47.37, 47.26, 47.27, 655, 280/30, 37, 643, 644, 645, 658
See application file for complete search history.

(56) References Cited

U.S. PATENT DOCUMENTS

| | | | | |
|---|---|---|---|---|
| 2,990,190 A | * | 6/1961 | Eriksen | ........................ 280/30 |
| 4,537,414 A | * | 8/1985 | Nusbaum | .................. 280/47.41 |
| 4,762,331 A | * | 8/1988 | Tucker et al. | .................. 280/30 |
| 5,104,134 A | * | 4/1992 | Cone | ............................ 280/30 |
| 5,383,585 A | * | 1/1995 | Weiss | .......................... 280/30 |
| 5,595,393 A | | 1/1997 | Batten | |
| 5,611,596 A | | 3/1997 | Barley | |
| 6,089,666 A | * | 7/2000 | Rosko | ...................... 280/47.38 |
| 6,367,821 B2 | | 4/2002 | Thiele | |
| 6,386,575 B1 | * | 5/2002 | Turner | ......................... 280/650 |
| 6,729,630 B2 | | 5/2004 | Szmidt et al. | |
| 6,783,135 B1 | | 8/2004 | Nord | |
| 2002/0060444 A1 | | 5/2002 | Cote | |
| 2003/0192925 A1 | | 10/2003 | Boone | |
| 2003/0227149 A1 | | 12/2003 | Budge | |
| 2004/0075229 A1 | | 4/2004 | Huntley | |

* cited by examiner

*Primary Examiner*—Hau Phan
(74) *Attorney, Agent, or Firm*—Womble Carlyle

(57) ABSTRACT

An apparatus for transporting a child safety seat includes a wheeled assembly a clamping bracket for applying a clamping force to the back of the child safety seat and positioning members to ensure that the apparatus is properly positioned relative thereto. The apparatus with attached child safety seat may be wheeled on the ground by a person using one hand. The apparatus is fully detachable from the child safety seat.

14 Claims, 7 Drawing Sheets

US 6,991,241 B1

CHILD SAFETY SEAT DOLLY HAVING CLAMPING BRACKET

FIELD OF THE INVENTION

The present invention relates to transporting a child safety seat such as an infant car seat, child car seat, or a child booster seat. In particular, the invention relates to a two-wheeled dolly for transporting a child safety seat by wheeling it on the ground.

BACKGROUND OF THE INVENTION

The use of child safety seats for the safe restraint of infants and children in vehicles is well known. For the safety and comfort of an infant or child, and also to comply with applicable laws requiring the use of child safety seats for children of specified ages, child safety seats now are commonly removed from the family vehicle and taken along on travels. For example, a child's child safety seat may be used for the child in a rental car on the family vacation. In addition, child safety seats commonly may be used in other modes of transportation, such as airplanes, buses, boats, or trains, to provide a safer and more comfortable seat for young children.

Such use of child safety seats away from the family vehicle thus requires the transport of the child safety seats through airport terminals, bus stations, train stations, boat terminals, and the like. The typical infant or child safety seat is quite bulky, of an awkward shape, and may weigh between ten and twenty pounds. Thus the physical size, structure, and weight of the child safety seat make it difficult to carry and for most persons, require the use of both hands. This is particularly necessary if the child safety seat is carried for a substantial distance.

Various devices have been developed to assist with the transport of child safety seats, including a wide variety of bags, totes, and cases. Typically these travel bags comprise a zippered sack, with a handle and/or shoulder strap. The child safety seat may be placed in the sack and then carried from the family vehicle to baggage check, or onto the airplane, bus, etc.

Alternatively, some models of child safety seats are provided with wheels and a handle, essentially converting the child safety seat into a stroller so that it can be wheeled through an airport or other area. In addition, stroller-type attachments are made for child safety seats, again converting the child safety seat to a stroller-like apparatus that can be wheeled to its destination. Typically, a child young enough to require the use of a child safety seat is also too young to walk any considerable distance through an airport terminal, train station, etc. This generally requires that the child also be carried, typically in a stroller, a backpack or front carrier, or simply in the guardian's arms. In addition, travel with young children generally entails transporting various other equipment, such as diaper bags. As a result, persons transporting young children while traveling must potentially negotiate a number of large, awkward items, in addition to the child.

A prior solution in which the wheels and handle are separately formed and attached to a child safety seat is disclosed in U.S. Pat. No. 6,267,821. Solutions is which the wheels and handle are formed in one unit separable from the child safety seat are disclosed in U.S. Patent Publication No. 2003/0192925 A1, and U.S. Pat. Nos. 6,729,620 and 6,783,135. The contents of these published applications and issued patents are incorporated by reference.

SUMMARY OF THE INVENTION

In one aspect, the present invention is directed to a child safety seat dolly assembly having a dolly frame, a pair of horizontally spaced apart positioning members attached to the dolly frame, and a clamping bracket, the assembly being adjustable between a first, disassembled state in which the clamping bracket is separated from the dolly frame, and a second, assembled state in which the clamping bracket is attached to the dolly frame. The dolly frame has a first side facing in a first direction, a pair of wheels rotatably mounted on the dolly frame at a lower portion thereof, and a handle member. The horizontally spaced apart positioning members project are located on a lower portion of the dolly frame and project in the first direction. The clamping member has a front face, a back face, and first and second end faces. The clamping member also has at least one leg projecting from the back face in a direction transverse to the body member, and first and second clamping surfaces located on the back face, the first clamping surface located between said at least one leg and the first end face and the second clamping surface located between said at least one leg and the second end face.

Preferably, the clamping member has two legs. In such case, the clamping bracket is secured to the dolly frame via a pair of bolts that pass through the first and second legs and through a pair of spaced apart through holes formed on the body frame. A pair of thumb screws may be employed to secure the bolts to the dolly frame. In addition, in the assembled state with the dolly assembly in an upright position, the clamping bracket's clamping member extends in a horizontal direction. Furthermore, in the assembled state with the dolly assembly in an upright position, the clamping bracket's clamping member extends past left and right side edges of the dolly frame, in either a front or rear view of the dolly.

In another aspect, the present invention is directed to a child safety seat dolly including a dolly frame, a pair of horizontally spaced apart positioning members attached to a lower portion of the dolly frame, and a clamping bracket removably secured to the dolly frame, the positioning members and the clamping bracket projecting in a common direction relative to the body frame. The dolly frame has a first side facing in a first direction, a pair of wheels rotatably mounted on the dolly frame at a lower portion thereof, and a handle member. The clamping bracket includes a clamping member having a front face, a back face, and first and second end faces, first and second legs projecting from the back face in a direction transverse to the body member; first and second clamping surfaces located on the back face, the first clamping surface located between the first leg and the first end face, and the second clamping surface located between the second leg and the second end face. The clamping bracket's first and second legs are spaced apart in the horizontal direction and the clamping bracket's clamping member is horizontally oriented in a front view of the dolly when the dolly is in an upright position.

In yet another aspect, the present invention is directed to a child safety seat dolly in combination with a child safety seat. The dolly comprises a dolly frame, a pair of horizontally spaced apart positioning members, and a clamping bracket removably secured to the dolly frame and comprising a clamping member have a pair of spaced apart clamping surfaces facing in a direction of the dolly frame, the positioning members and the clamping bracket projecting in a common direction relative to the body frame. The child safety seat comprises a pair of spaced apart apertures in which said positioning members are received, and a pair of spaced apart abutment surfaces against which the pair of spaced apart clamping surfaces clampingly abut, thereby securing the child safety seat to the child safety seat dolly.

When such a combination is at rest on a flat surface, a base portion of child safety seat and a pair of wheels attached to the dolly frame both contact the flat surface.

In still another aspect, the present invention is directed to a method of securing a child safety seat dolly to a child safety seat. The method includes the steps of positioning a clamping bracket having first and second clamping surfaces against a pair of spaced apart abutment surfaces formed on a rear portion of the child safety seat, inserting a pair of spaced apart positioning members provided on the dolly into a pair of apertures formed on a rear portion of the child safety seat, receiving ends of bolts attached to the clamping bracket into holes formed in the dolly; and placing and then turning thumb screws on ends of the bolts, after the bolts have passed through said dolly.

BRIEF DESCRIPTION OF THE DRAWINGS

The present invention will now be described with respect to the following figures in which.

DETAILED DESCRIPTION OF THE INVENTION

Figure 1:
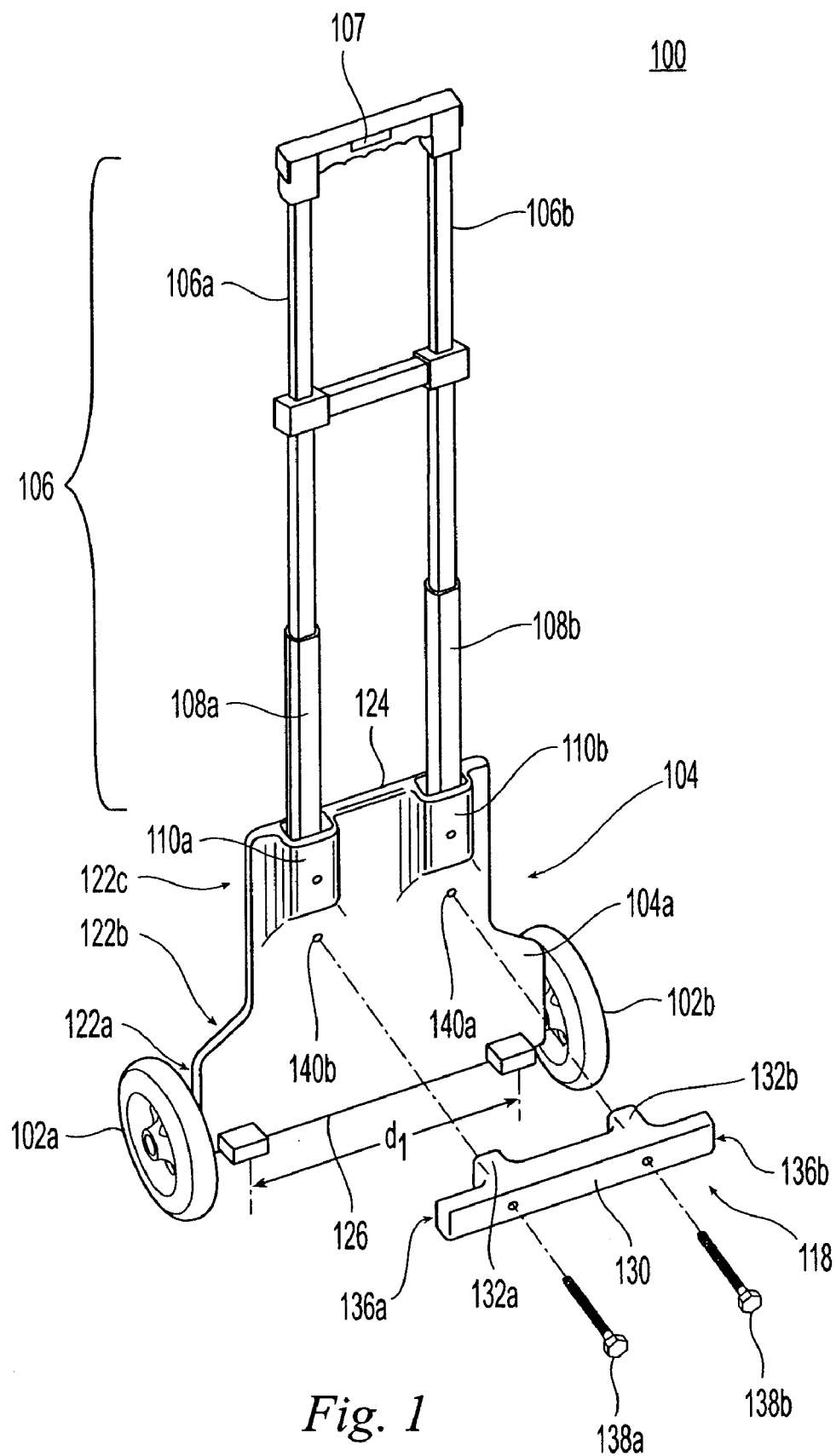
FIG. 1 is a partially exploded perspective view of a dolly in accordance with the present invention.

FIG. 1 shows a partially exploded view of a dolly 100 in accordance with the present invention. The dolly 100 has two wheels 102a, 102b attached to a lower portion 122a of a dolly frame 104. In a preferred embodiment, the dolly frame comprises a substantially flat body member 104. The body member 104 has a front side 104a defining a first plane, and a back side 104b. The body member 104 has a lower portion 122a with a first width, a tapered portion 122b, and an upper portion 122c having a second width which is smaller than first width. The tapered portion is connected on a lower side to the lower portion and on an upper side to an upper portion 122c.

Attached to the body member 104 is a telescoping handle member 106 provided with parallel legs 106a, 106b and a handle release 107 in a top surface thereof. The handle member has a pair of legs 108a, 108b that are fixedly mounted in sleeves 110a, 110b. The sleeves 110a, 110b are provided proximate an upper edge of the upper portion 122c of the body member 104.

Critical to the present invention, the front side 104a of the body member 104 is provided with a plurality of mating structures 116a, 116b and 118, all of which protrude from the front face 104a of the dolly's body member 104.

Spaced apart lower mating structures 116a, 116b are provided on the lower portion 122a of the body member 104. The lower mating structures preferably have unitary construction with the body member 104 and thus the body member and the lower mating structures may comprise a single continuous piece of common molded material, such as a hard plastic. In a preferred embodiment, the lower mating structures 116a, 116b serve as positioning members. Centers of the positioning members 116a, 116b are separated by a distance d1. The positioning members 116a, 116b are at the same vertical height from a surface on which the dolly 100 is held in an upright position. Preferably, they are placed along a lower edge 126 of the body member 104. The positioning members 116a, 116b are configured and dimensioned to locate the dolly relative the back side of a child safety seat, as discussed further below.

In a preferred embodiment, the positioning members 116a, 116b have a prismoidal shape with a height h1, a width w1 and a depth taken in a direction normal to the front face 104a of the body member 104. The values of these three parameters may vary depending on the dimensions of structures on the back surface of a child safety seat to which the positioning members are mated. In particular, at least the height h1 and width w1 preferably are such that there remains little clearance between the outer surfaces of the positioning members and the structures to which they are mated.

The upper mating structure 118 is spaced apart in the vertical direction from the lower mating structures 116a, 116b. As seen in the figures, in a preferred embodiment, the upper mating structure 118 is in the form of a pi-shaped clamping bracket (Greek letter 'π') 100. The clamping bracket 118 comprises a horizontally extending clamping member 130 of length d3 and having a front face 130a and an oppositely facing back face 130b. First and second legs 132a, 132b extending at right angles to the clamping member 130 are provided on the back face 130b. The legs serve to hold the horizontally extending clamping member 130 away from the body member 104.

The back face 130b has first and second lateral surfaces 134a, 134b, respectively. The lateral surfaces are located between each leg 132a, 132b and its associated end face 136a, 136b respectively. At least a portion of these lateral surfaces 134a, 134b serve as clamping surfaces. Thus, in the assembled dolly, the lateral surfaces 134a, 134b face in the direction of the body member 104 and the clamping force is directed towards the body member 104.

In a preferred embodiment, the legs 132a, 132b of the clamping bracket 118 are attached to body member 104 via bolts 138a, 138b. Bolts 138a, 138b are inserted through the front face 130a of the clamping member 130, pass through the legs 132a, 132b and through holes 140a, 140b formed in the body member 104. The terminal ends of the bolts 138a, 138b that protrude on the back face 104b of the body member 104 are secured by placing and then turning manually manipulable thumb screws 142a, 142b, respectively.

Figure 2:
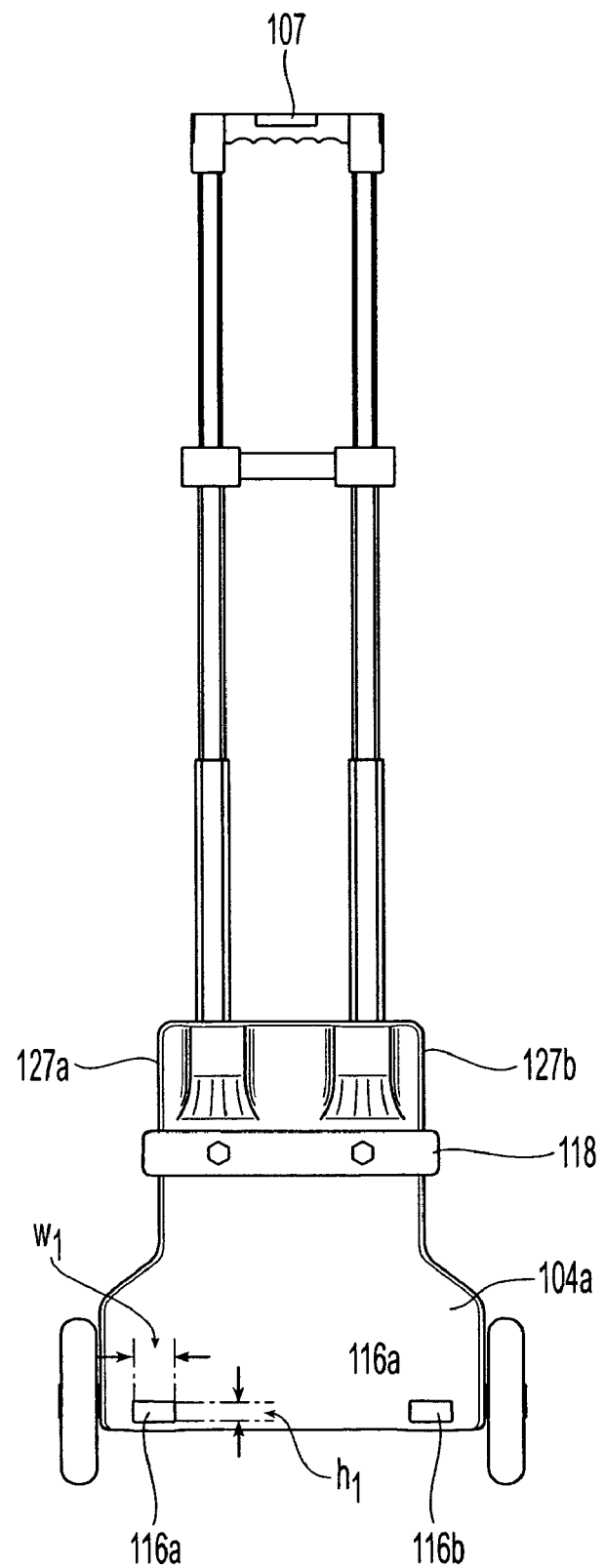
FIG. 2 is a front view of an assembled dolly of FIG. 1 in an upright position with the handle in the deployed position.
Figure 3:
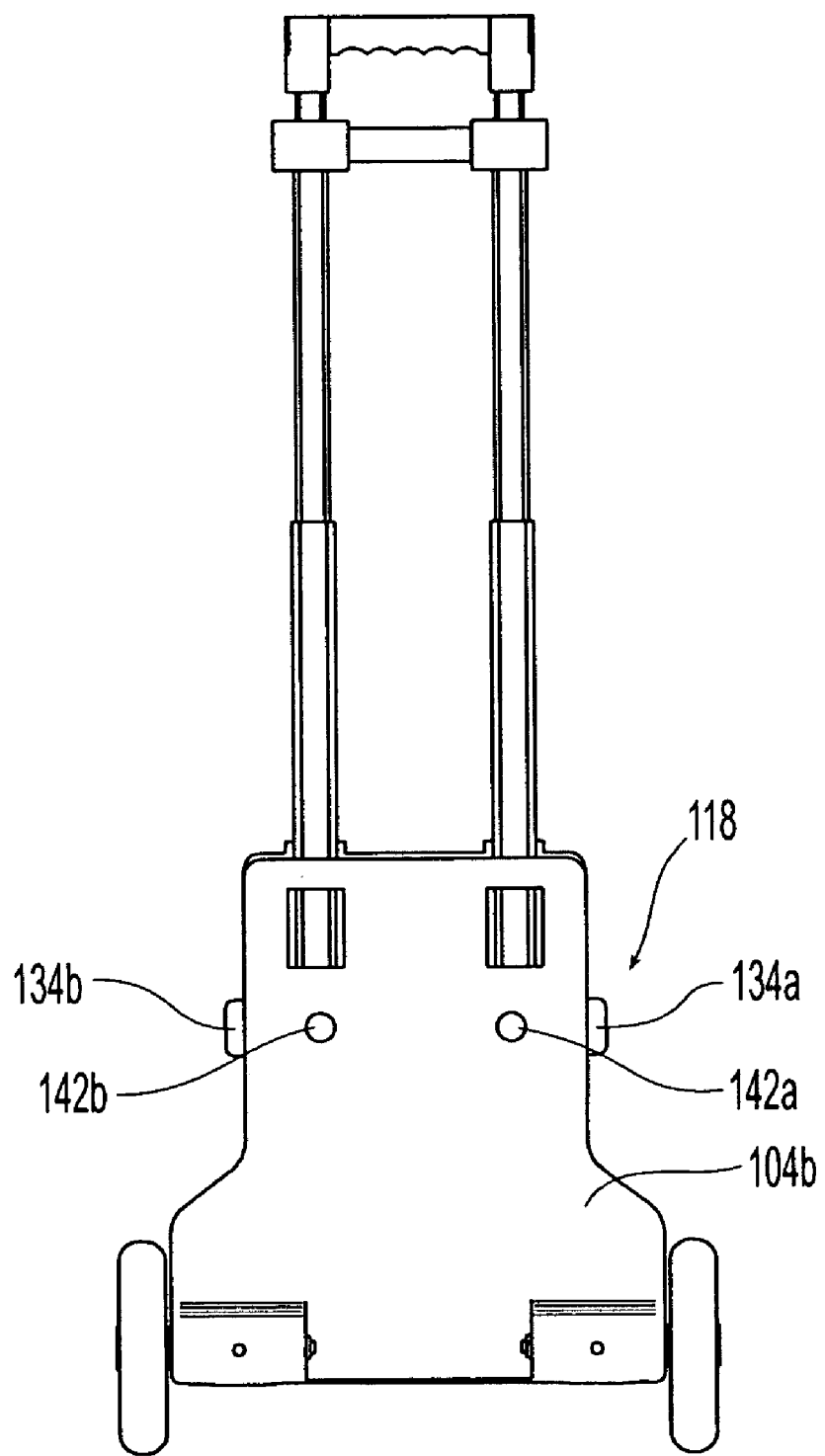
FIG. 3 is a rear view of an assembled dolly of FIG. 1 in an upright position with the handle in the retracted position.

In FIG. 1, the dolly may be considered to be in a disassembled state since the clamping bracket 118 is not attached to the body member 104. In FIGS. 2 and 3, on the other hand, the dolly 100 is in the assembled state with the clamping bracket secured to the body member 104. As seen in FIGS. 2 and 3, in both a front view and a rear view of the dolly 100 in the assembled state, the ends of the clamping member 130 extend laterally beyond the left and right side edges 127a, 127b, respectively, of the body member 104. And, as seen in FIG. 3, at least a portion of the lateral clamping surfaces 134a, 134b, are visible in a rear view of the dolly 100.

Figure 4:
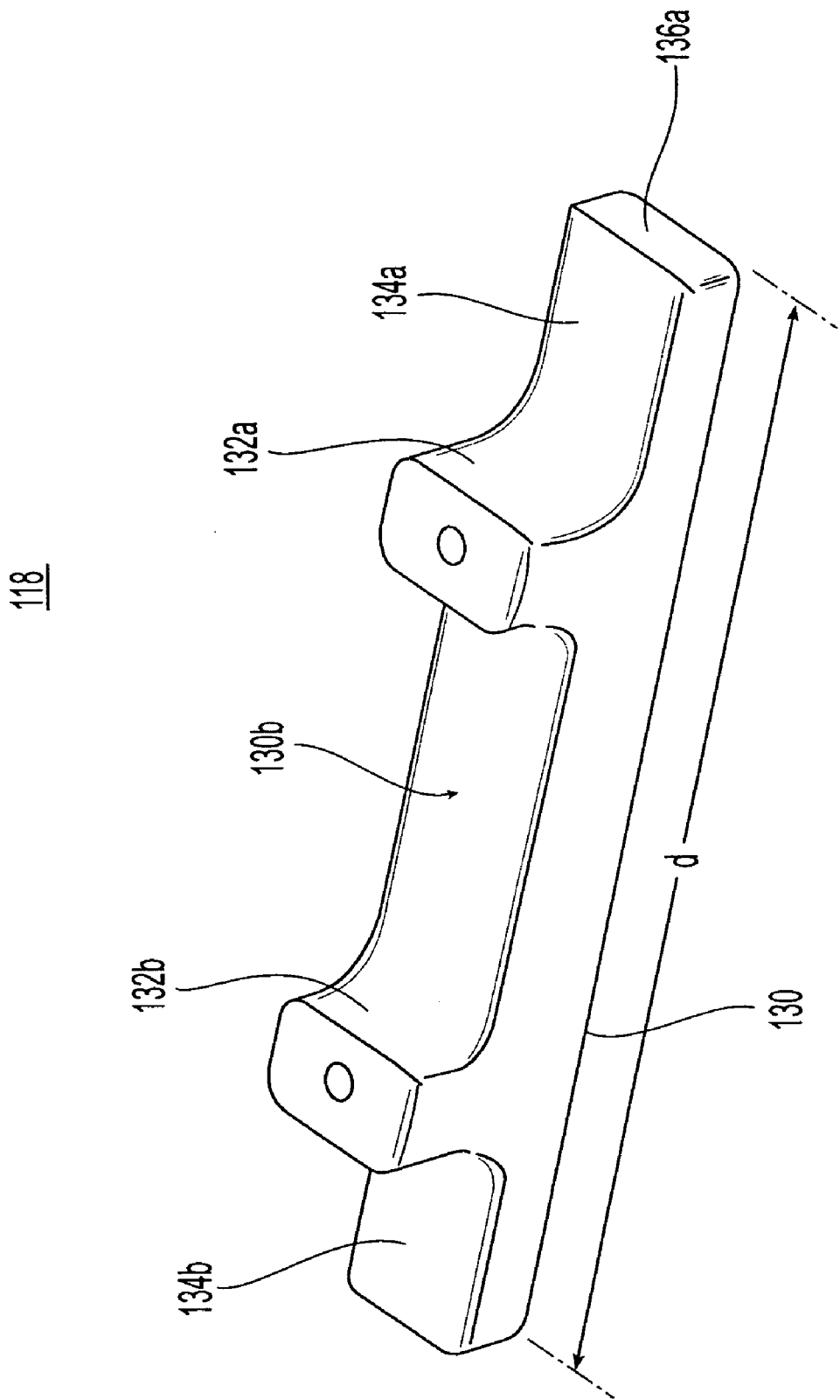
FIG. 4 shows a perspective view of the clamping bracket.
Figure 5:
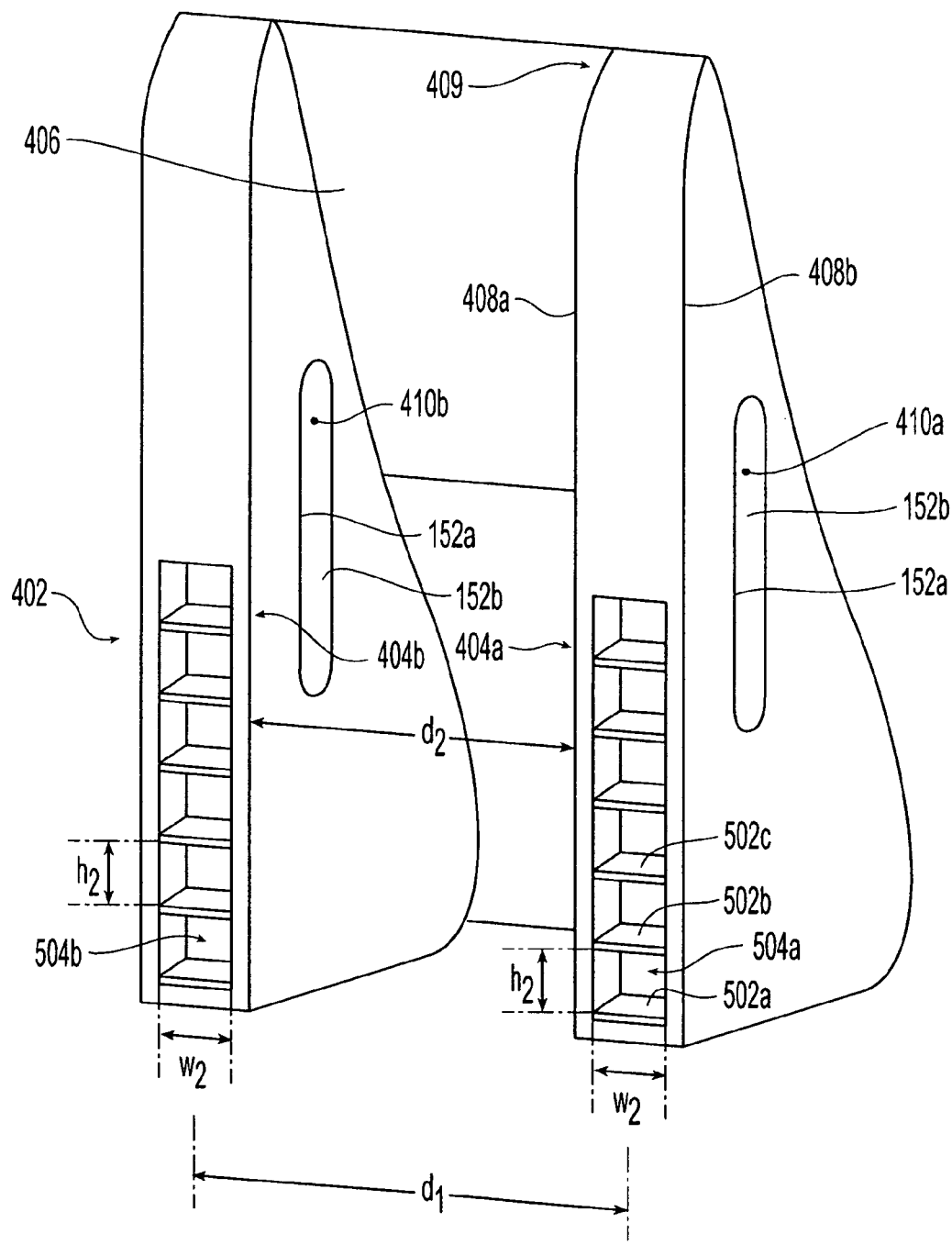
FIG. 5 illustrates the back portion of a child safety seat for which the dolly of the present invention is suitable.

FIG. 4 shows the back side 402 of a child safety seat's seating portion 400. The seating portion 400 is pivotally mounted on an associated base portion (not shown in FIG. 4) which permits tilting of the seating portion 400. The back side 402 includes a pair of spaced apart, vertically extending side supports 404a, 404b. The side supports 404a, 404b extend in a rearward direction from the seatback 406. Preferably, the side supports and seatback are all molded together. Side supports 404a, 4040b each have a side aperture 410a, 401b extending in a direction transverse to the side supports.

Since the side supports are very similar, only side support 404a is described, it being understood that side supports 404b is a mirror image of support rail 404a. Side support 404a comprises an inner wall 408a and an outer wall 408b. The inner wall 408a and outer wall 408b are substantially parallel to each other at the base 408, but merge with one another near the top 409.

At its rearwardmost portion, the side support 404a is provided with a plurality of horizontally extending support fins 502a, 502b, 502c, etc., which connect the inner wall 408a and the outer wall 408b. The support fins lend structural rigidity to the side support 404a while minimizing weight. The inner and outer walls 408a, 408b and adjacent support fins 502a, 502b define therebetween a locating aperture 504a that is located at the rear of the side support 404a and is open in the rearward direction of the seating portion 400. It is understood that the other side support 404b also has a similar locating aperture 504b. The back of the child safety seat disclosed in U.S. Pat. No. 5,611,596, whose contents are incorporated by reference, discloses similar support fins.

The centers of the side supports 404a, 404b are separated by a horizontal distance d1, which corresponds to the horizontal distance between centers of the positioning members 116a, 116b. The vertical spacing h2 between adjacent support fins 502a and 502b is just slightly greater than a height dimension h1 of positioning members 116a, 116b. Meanwhile the horizontal extent w2 of one or more of the support fins 502a, 502b, 502c, is just slightly greater than a width dimension w1 of positioning members 116a, 116b. Finally, the positioning members 116a, 116b on an upright dolly and the locating apertures 504a, 504b (by virtue of the associated base portion) are at a substantially similar height above a common ground surface on which both are placed. Thus, the positioning members 116a, 116b are configured and dimensioned, and also located relative to one another on the dolly 100, to be received in locating apertures 504a, 504b.

The inner walls of the side supports 404a, 404b are spaced apart by a distance d2 at a point where the side apertures 410a, 401b are formed. This distance d2 is less than the length d3 of the clamping bracket's clamping member 130.

Figure 6:
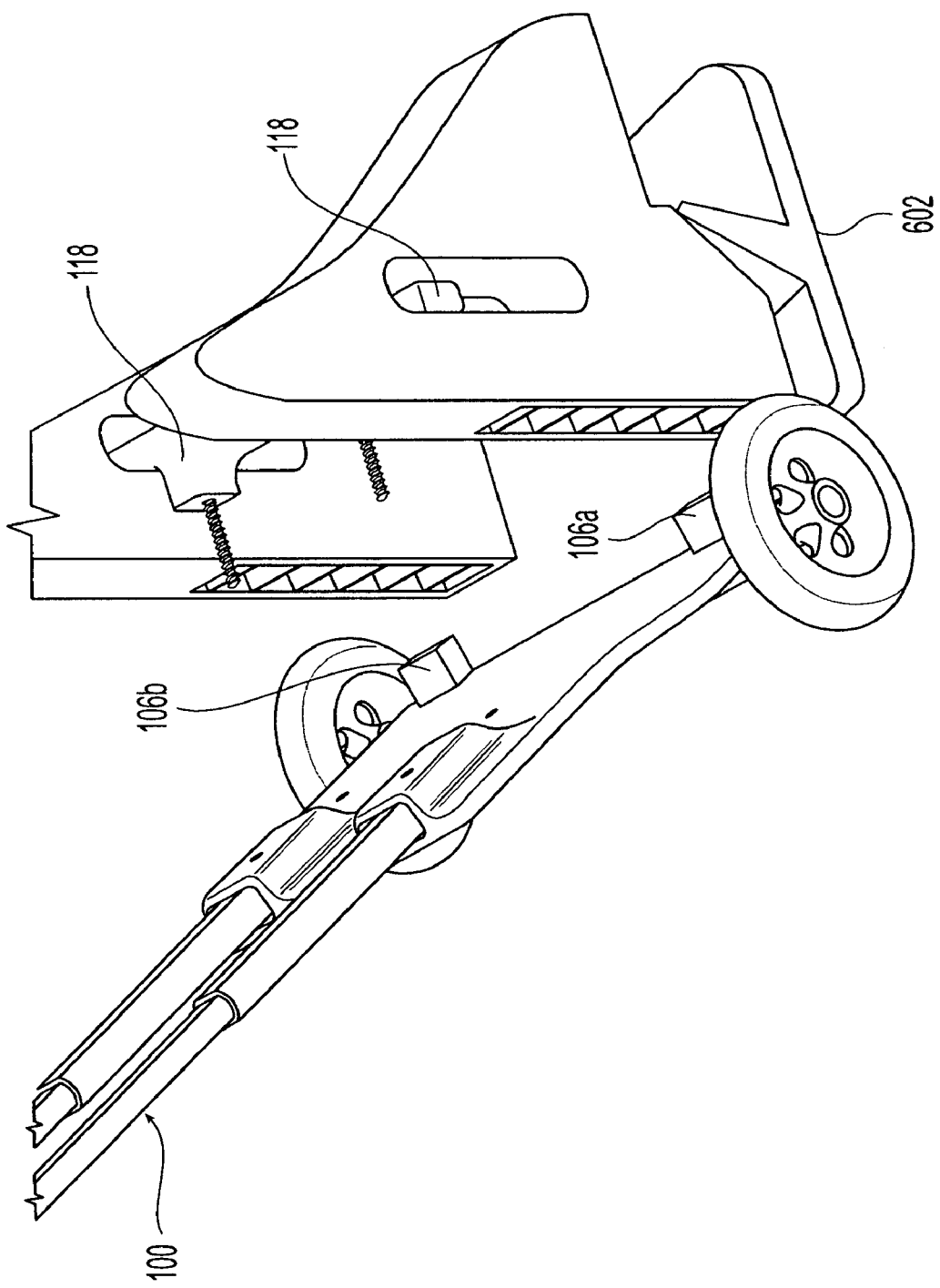
FIG. 6 shows a dolly of the present invention about to be mated with a child safety seat.

FIG. 6 shows a dolly about to be mated to a child safety seat having a child safety seat base 602 and a seating portion. The child safety seat shown in FIG. 6 and FIG. 7 preferably is similar to one or more of the seats shown in aforementioned the U.S. Pat. No. 5,611,596.

To employ the dolly 100, one first places the clamping bracket 118 such that it is supported near its opposite ends 136a, 136b within the side apertures 410a, 410b, respectively. The clamping bracket 118 may be wedged into position, depending on the spacing between opposing rear and front faces 152a, 152b, respectively, of the side apertures 410a, 410b, and also depending on the thickness of the clamping member 130 at the clamping surfaces 134a, 134b. Alternatively, the clamping bracket may temporarily be supported by structures provided on the opposing faces 152a, 152b of the side apertures. If necessary, the clamping bracket 118 is rotated such that the legs 132a, 132b face in the rearward direction with the bolts 138a, 138b protruding through the legs.

With the clamping bracket in place, the remainder of the dolly is then brought towards the bolts 138a, 138b until the bolts pass through the through holes 140a, 140b formed in the body member 104. At this point, the clamping surfaces 134a, 134b press against the forward faces 152a of the side apertures 410a, 410b, which serve as abutment surfaces 152a. And at about the same time the bolts 138a, 138b pass through the through holes, the positioning members 116a, 116b are aligned with, and are then inserted into, the locating apertures 504a, 504b. Once the bolts protrude through the back side 104b of the body member 104 and the positioning members are received into the locating apertures, the thumb screws 142a, 142b are then turned and hand-tightened to secure the dolly 100 to the seat portion 400 with the clamping surfaces 134a, 134b applying a clamping force against the abutment surfaces 152a of the side apertures 410a, 410b.

Figure 7:
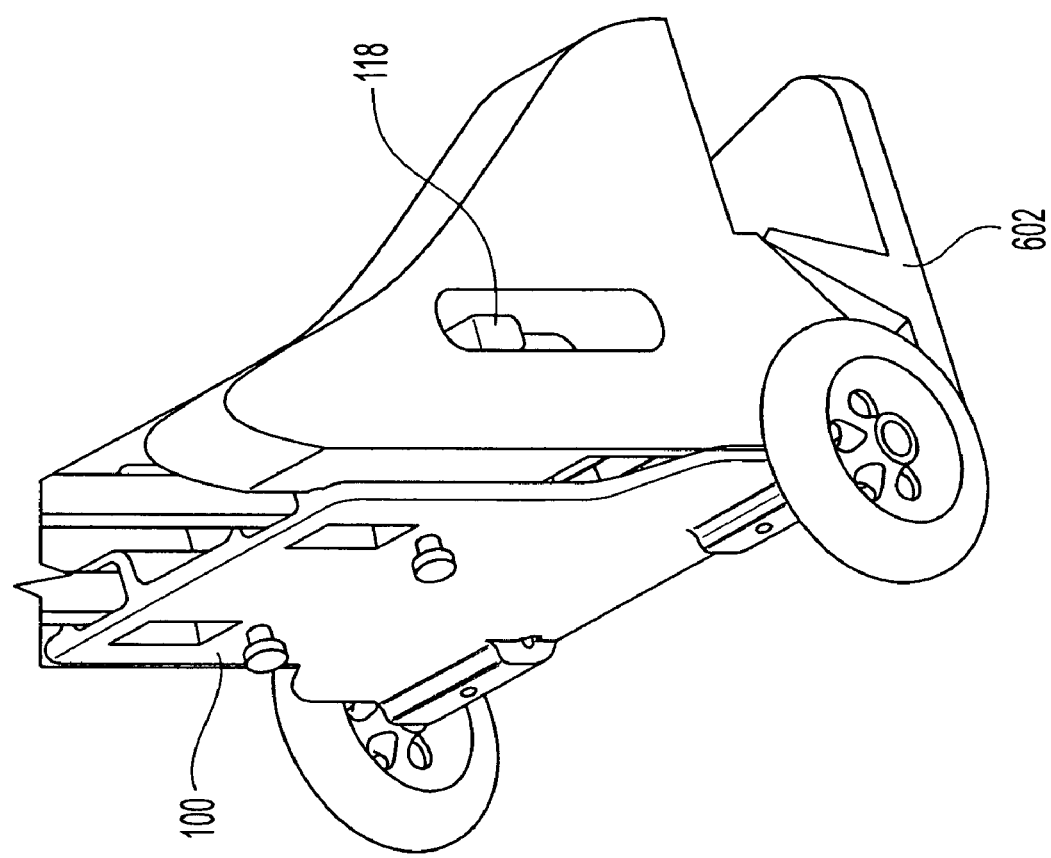
FIG. 7 shows a dolly of the present invention mated with a child safety seat.

The foregoing process in the assembly of FIG. 7 where the dolly 100 is in combination with a child safety seat with the clamping bracket 118 forcing a rear portion of the car seat against the front side 104a of the body 104 whilst the positioning members are positioned in the locating apertures. Thus, the child safety seat comprises a pair of spaced apart apertures 504a, 504b in which said positioning members 116a, 116b, respectively, are received, and a pair of spaced apart abutment surfaces 152 against which the pair of spaced apart clamping surfaces 134a, 134b clampingly abut, thereby securing the child safety seat to the child safety seat dolly.

One feature of a dolly in accordance with the present invention is that it does not require the child safety seat to be modified. This obviates the need to permanently change any existing components or attach any new components, either of which may violate regulations an specifications governing such seats. Thus, a dolly in accordance with the present invention may be used in conjunction with prior art child safety seats having the necessary structures to mate with the clamping bracket and the location members.

Another feature of a dolly in accordance with the present invention is that, as seen in the assembled position of FIG. 7, both the wheels and the car seat base 602 can simultaneously touch the ground when the combination is at rest. This means that only a minimal degree of tilting is required to provide sufficient clearance for transporting the child safety seat using the dolly.

In the foregoing description, the clamping force was applied in the rearward direction with the clamping bracket's clamping surfaces pressing against the front faces of the side apertures. It is noted that the clamping surfaces may press against other formations provided on the back side of a child safety seat, as well. Furthermore, the positioning members may be mated to location apertures situated in locations other than those shown in the preferred embodiment. Thus, the dolly of the present invention may be marketed with the clamping bracket and the positioning members in different configurations that are matched to specific models of child safety seats.

Although the present invention has been described to a certain degree of particularity, it should be understood that various alterations and modifications could be made without departing from the scope of the invention as hereinafter claimed.

What is claimed is:

1. A child safety seat dolly assembly comprising:
   a dolly frame having a first side facing in a first direction, a pair of wheels rotatably mounted on the dolly frame at a lower portion thereof, and a handle member;
   a pair of horizontally spaced apart positioning members attached to the dolly frame and projecting in the first direction, the positioning members being located on a lower portion of the dolly frame; and
   a clamping bracket comprising:
      a clamping member having a front face, a back face, and first and second end faces,
      at least one leg projecting from the back face in a direction transverse to the body member; and
      first and second clamping surfaces located on the back face, the first clamping surface located between said at least one leg and the first end face and the second clamping surface located between said at least one leg and the second end face;
   wherein the child safety seat dolly assembly is adjustable between:
      a first, disassembled state in which the clamping bracket is separated from the dolly frame; and
      a second, assembled state in which the clamping bracket is secured to the dolly frame.

2. The child safety seat dolly assembly according to claim 1, wherein:
   the clamping bracket comprises spaced apart first and second legs projecting from the back face, and
   said first clamping surface is located on the back face between the first leg and the first end face and said second clamping surface is located on the back face between the second leg and the second end face.

3. The child safety seat dolly assembly according to claim 2, wherein the clamping bracket is secured to the dolly frame via a pair of bolts that pass through the first and second legs and through a pair of spaced apart through holes formed on the body frame, when the dolly assembly is in the assembled state.

4. The child safety seat dolly assembly according to claim 3, farther comprising a pair of thumb screws for securing said bolts to said dolly frame.

5. The child safety seat dolly assembly according to claim 1, wherein, in the assembled state with the dolly assembly in an upright position, the clamping bracket's clamping member extends in a horizontal direction.

6. The child safety seat dolly assembly according to claim 5, wherein, in the assembled state with the dolly assembly in an upright position, the clamping bracket's clamping member extends past left and right side edges of the dolly frame, in either a front or rear view of the dolly.

7. A child safety seat dolly comprising:
   a dolly frame having a first side facing in a first direction, a pair of wheels rotatably mounted on the dolly frame at a lower portion thereof, and a handle member;
   a pair of horizontally spaced apart positioning members attached to the dolly frame and projecting in the first direction, the positioning members being located on a lower portion of the dolly frame; and
   a clamping bracket comprising:
      a clamping member having a front face, a back face, and first and second end faces,
      first and second legs projecting from the back face in a direction transverse to the body member; and
      first and second clamping surfaces located on the back face, the first clamping surface located between the first leg and the first end face, and the second clamping surface located between the second leg and the second end face;
   wherein
      the clamping bracket is removably secured to the first side of the dolly frame via the first and second legs and projects in said first direction; and
      the clamping bracket's first and second legs are spaced apart in the horizontal direction and the clamping bracket's clamping member is horizontally oriented in a front view of the dolly when in an upright position.

8. A child safety seat dolly in combination with a child safety seat wherein:
   the dolly comprises a dolly frame, a pair of horizontally spaced apart positioning members, and a clamping bracket removably secured to the dolly frame, the clamping bracket comprising a clamping member having a pair of spaced apart clamping surfaces facing in a direction of the dolly frame, the positioning members and the clamping bracket projecting in a common direction relative to the body frame;
   the child safety seat comprises a pair of spaced apart apertures in which said positioning members are received, and a pair of spaced apart abutment surfaces against which the pair of spaced apart clamping surfaces clampingly abut, thereby securing the child safety seat to the child safety seat dolly.

9. The child safety seat dolly in combination with a child safety seat according to claim 8, wherein when the combination is at rest on a flat surface, a base portion of child safety seat and a pair of wheels attached to the dolly frame both contact the flat surface.

10. The child safety seat dolly in combination with a child safety seat according to claim 8, wherein:
    the child safety seat comprises a pair of side supports; and
    the spaced apart abutment surfaces against which the pair of spaced apart clamping surfaces clampingly abut, are located in side apertures formed in said side supports.

11. The child safety seat dolly in combination with a child safety seat according to claim 8, wherein:
    the child safety seat comprises a pair of side supports; and
    the spaced apart apertures in which said positioning members are received, are formed on rear portions of said side supports.

12. A method of securing a child safety seat dolly to a child safety seat, the child safety seat dolly including a dolly frame having a front side facing in a first direction, a pair of wheels rotatably mounted on the dolly frame at a lower portion thereof, a handle member, and a pair of spaced at positioning members attached to the dolly frame and projecting in the first direction, the method comprising:
    positioning a clamping bracket having first and second clamping surfaces against a pair of spaced apart abutment surfaces formed on a rear portion of the child safety seat;
    inserting said pair of spaced apart positioning members into a pair of apertures formed on a rear portion of the child safety seat;
    receiving ends of bolts attached to the clamping bracket into holes formed in the dolly; and
    placing and then turning thumb screws on ends of the bolts, after the bolts have passed through said dolly.

13. The method according to claim 12, comprising:
    positioning said clamping bracket such that the first and second clamping surfaces face in a direction of said dolly.

14. The method according to claim 12, wherein the steps of inserting, receiving and turning all take place after the positioning step.

* * * * *